Patented Aug. 7, 1945

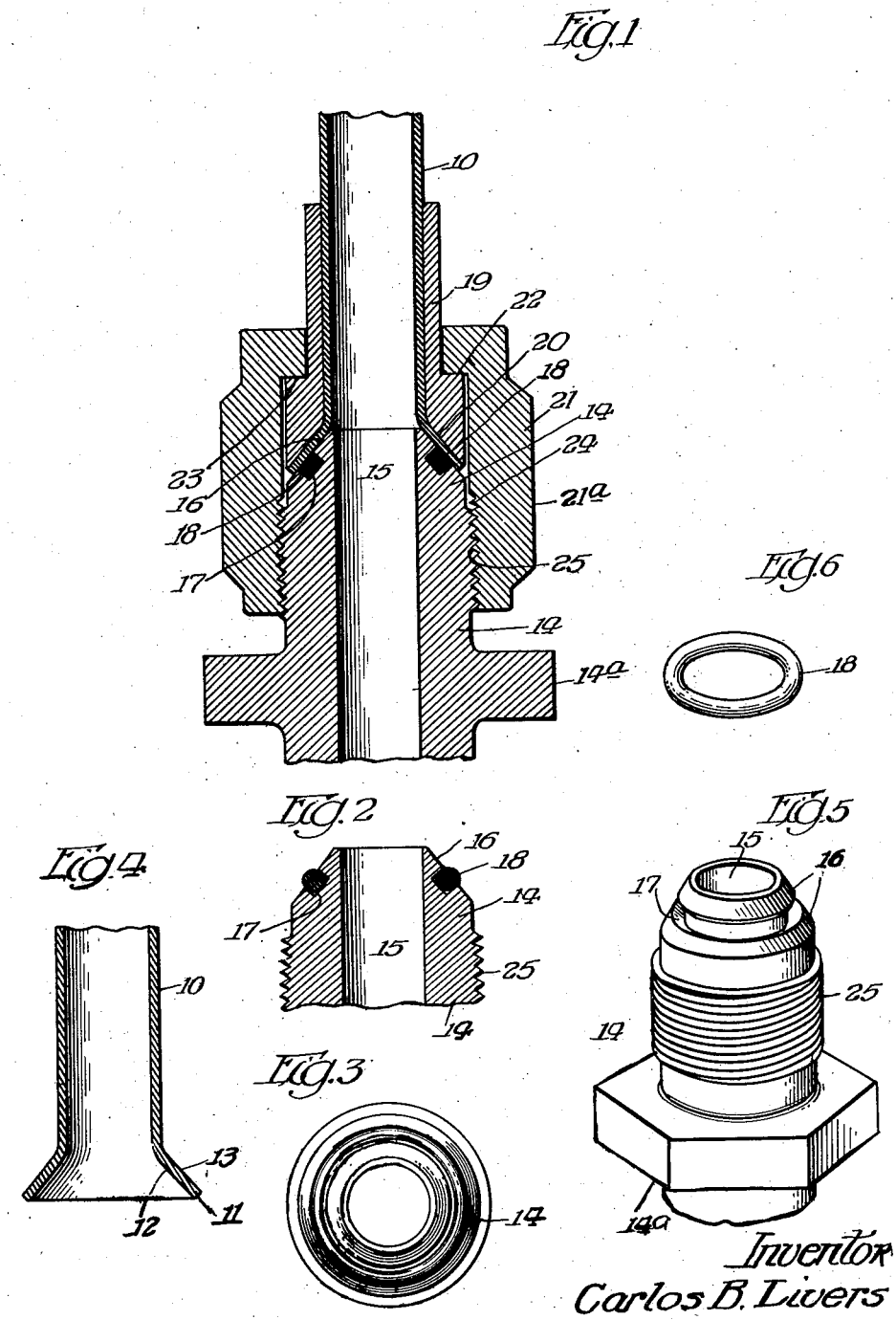

2,381,829

UNITED STATES PATENT OFFICE 2,381,829

TUBE COUPLING

Carlos B. Livers, San Diego, Calif., assignor to Consolidated Vultee Aircraft Corporation, San Diego, Calif., a corporation of Delaware Application June 18, 1943, Serial No. 491,276

2 Claims. (Cl. 285—86)

The invention relates to tube couplings and more particularly to that type used for hydraulic systems which carry fluid under high pressures.

Heretofore in couplings for tubes used for conducting hydraulic fluid under high pressures the flared end of a tube was clamped between coupling members of metal by a screw-threaded connection for drawing the members together for sufficient tightness to fit between the engaging metal surfaces of one of the members and the tube to prevent leakage, and it was necessary to use considerable wrench torque to produce such tightness. In this type of coupling in which metal faces are clamped together even slight surface mutilation in either of the engaging faces on the tube or the coupling member, or clamping them together with insufficient pressure to produce a leak-proof fit, resulted in leakage. Where wrench torque is depended upon to produce the tightness of fit between metal faces, it frequently occurs that adequate wrench torque for such tightness is not applied in making a connection with the coupling. It has also been found that surface mutilations frequently result in the engaging faces depended upon for sealing when the coupling is once connected with excessive pressure so that when the coupling is again connected the surface mutilations present will result in leakage even though the surfaces are tightly clamped together. These mutilations made replacement necessary when the couplings were used in hydraulic systems which carried fluid under high pressures.

One object of the invention is to provide a tube coupling of this type by which the foregoing objections are overcome. This result is attained primarily by providing an elastic seal supplemental to the metal engaging faces between the flared end of the tube and the coupling member on which it is seated which prevents leakage through surface mutilations in said faces.

Another object of the invention is to provide a tube coupling of this type which prevents leakage without requiring high wrench torque in making the connection.

Other objects of the invention will appear from the detailed description.

The invention consists in the several novel features which are hereinafter set forth and more particularly defined by claims at the conclusion hereof.

In the drawing:

Fig. 1 is a longitudinal section of a coupling exemplifying the invention.

Fig. 2 is a section of the coupling member provided with a conical seat for engaging the internally flared face on the end portion of the tube with the elastic ring therein before the latter is subjected to compression in the groove in said member.

Fig. 3 is a plan of the member as illustrated in Fig. 2.

Fig. 4 is a section of the tube.

Fig. 5 is a detail perspective of the tubular member which is provided with a conical seat for the flared end of the tube.

Fig. 6 is a perspective of the elastic ring.

The invention is exemplified in a coupling comprising a tube 10, the end portion of which is formed with a flared end portion 11 having a flared, preferably conical, internal face 12 and an annular flared or conical external face 13. In practice, the tube is formed of suitable metal, such as aluminum alloy, copper, or steel, which can be expanded to form this flared end portion. A tubular coupling member 14 has a conduit 15 which is coaxial with and communicates with the bore of the tube 10. Member 14 is provided with a tapered, preferably conical, seat 16 which is adapted to fit against the internal conical face 12 on the tube 10. A groove 17, preferably rectangular in cross section, is formed in or near the longitudinal center of the conical seat 16. A ring 18, preferably circular in cross section, of elastic material, such as rubber or other suitable substitute, is held in and extends around groove 17 and is of sufficient diameter so that normally a portion thereof protrudes from the conical seat 16 of member 14. The ring 18 is adapted to be compressed into the rectangular groove 17 when the flared end 11 of tube 10 is forced against the seat 16 on member 14. The rectangular groove 17 permits the elastic ring to be deformed from the cross-sectional shape shown in Fig. 2 to that shown in Fig. 1, and so that the ring will conform to and be compressed into the groove so that when the flared end 11 of the tube 10 and the tubular member 14 are drawn together, the annular internal face 12 at its longitudinal center will be pressed against the elastic ring to form between them a supplemental elastic seal and the face 12 at both sides of the ring will fit the tapered seat on the coupling member 14. The ring being forced into the groove 18 will not interfere with the pressure engagement of the internal flared face 12 and the conical seat 16. A sleeve 19 fits around the tube 10 and is provided at its inner end with an internal annular flared preferably conical surface 20 which fits the external flared or conical surface 13 on the end 11 of the tube 10. A collar 21 fits around the sleeve 19 and is provided at one end with a shoulder 22 adapted to abut against a shoulder 23 on sleeve 19 and with an internal screw-thread 24 at its other end engaging a corresponding external thread 25 on the tubular member 14.

The portion 21ª of collar 21 is usually hexagonal for the application of a wrench. The portion 14ª of member 14 is also hexagonal for the application of a wrench. These hexagonal portions permit one wrench to be applied to hold the member 14 against rotation while the collar 21 is turned by a second wrench when connecting or unconnecting the coupling.

In connecting the coupling, the member 14 with the elastic ring 18 in and protruding from groove 17 will be placed into the flared end 11 of tube 10. The collar 21 will be rotated to engage the threads 24, 25 until the shouldered engagement between the collar 21 and sleeve 19 forces the sleeve 19 and member 14 together and clamps the flared end 11 of the tube between the conical seat 16 on member 14 and the conical surface 20 on the sleeve. The surface 20 of sleeve 19 will directly engage the external conical surface on the flared end of tube 10 and the conical seat 16 will directly engage the internal conical face 12 on the tube 10 for metal to metal engagement of these parts. As the collar 21 is screwed onto the tubular member 14, the flared end 11 of the pipe will compress the elastic ring 18 in the groove 17 in the conical seat 16 with the result that if there is any surface mutilation in the conical face 12 on the tube or the tapered seat 16, the elastic ring will provide an elastic seal which effectively prevents any leakage resulting from such mutilation.

A characteristic result of the invention is that for withstanding high pressures, such as 6500 lbs. per square inch, it is not necessary to apply great wrench torque in order to prevent leakage from the coupling or to apply wrench torque which is likely to produce surface mutilations in the contacting conical faces 12 and 16. The elastic ring between the tubular member 14 and the internal conical face 12 on the tube always form an effective seal against leakage notwithstanding irregularity or surface mutilation on the conical seat 16 or the conical surface 12 on the tube.

The invention exemplifies a coupling whereby a tube having a flared inner end produced by expansion has a solid engagement with a tapered section on the tubular coupling member and a supplemental elastic seal which prevents leakage if there is a surface mutilation either on the internal flared surface of the tube or said conical seat, and which effectively prevents leakage without requiring great wrench torque for forcing said engaging surfaces together in order to prevent leakage.

The invention is not to be understood as restricted to the details set forth, since these may be modified within the scope of the appended claims without departing from the spirit and scope of the invention.

Having regard to the foregoing invention, what I claim as new and desire to secure by Letters Patent is:

1. A coupling comprising a tube provided with an end portion having internal and external flared annular surfaces; a tubular member aligned and communicating with the tube; a tapered seat for and engaged by the flared internal face on the tube; a sleeve around the tube provided with an internal flared annular face for engaging the external flared face of the tube and clamping the end portion of the tube against the tapered seat; means for drawing said sleeve and member together and clamping the flared end of the tube between them; the conical seat on the tubular member being provided centrally between its ends with an annular groove; and an elastic ring in the groove normally having a cross-sectional shape which will enter the groove and leave a portion thereof projecting from the groove and the plane of the tapered seat, the groove having a cross-sectional area greater than the cross-sectional area of the portion of the ring lying within the groove while the remaining portion projects from the seat, the projecting portion of the ring being engaged and deformed by the internal flared annular surface on the tube into shape to completely fill the groove when the tube is clamped between said members.

2. A coupling comprising a tube provided with an end portion having internal and external flared annular surfaces; a tubular member aligned and communicating with the tube; a tapered seat for and engaged by the flared internal face of the tube; a sleeve around the tube provided with an internal flared annular face for engaging the external flared face of the tube and clamping the end portion of the tube against the tapered seat; means for drawing said sleeve and member together and clamping the flared end of the tube between them; the conical seat on the tubular member being provided centrally between its ends with an annular groove substantially rectangular in cross-section; and an elastic ring in the groove normally substantially circular in cross-section and of a diameter which will normally leave an arcuate portion projecting from the groove, the ring being engaged by the internal conical face of the tube and thereby deformable into the rectangular cross-sectional shape of and to completely fill the groove when the members are clamped together with the flared end of the tube between them.

CARLOS B. LIVERS.